United States Patent
Matzen

(10) Patent No.: US 8,271,227 B2
(45) Date of Patent: Sep. 18, 2012

(54) MEASURING TRANSDUCER

(75) Inventor: Steen Moellebjerg Matzen, Sydals (DK)

(73) Assignee: Siemens Aktiengesellschaft, München (DE)

( * ) Notice: Subject to any disclaimer, the term of this patent is extended or adjusted under 35 U.S.C. 154(b) by 12 days.

(21) Appl. No.: 12/227,721

(22) PCT Filed: May 24, 2007

(86) PCT No.: PCT/EP2007/055049
§ 371 (c)(1),
(2), (4) Date: Nov. 25, 2008

(87) PCT Pub. No.: WO2007/137988
PCT Pub. Date: Dec. 6, 2007

(65) Prior Publication Data
US 2009/0183575 A1 Jul. 23, 2009

(30) Foreign Application Priority Data
May 26, 2006 (DE) .......................... 10 2006 024 742

(51) Int. Cl.
*G01D 1/00* (2006.01)
*G06F 11/30* (2006.01)
(52) U.S. Cl. ......... 702/127; 702/182; 702/188; 702/189

(58) Field of Classification Search .......... 702/127–142, 702/182–189
See application file for complete search history.

(56) References Cited

U.S. PATENT DOCUMENTS

| | | | | |
|---|---|---|---|---|
| 5,822,369 A | * | 10/1998 | Araki | 375/237 |
| 6,114,947 A | | 9/2000 | Tondorf | |
| 2004/0242976 A1 | * | 12/2004 | Abreu | 600/315 |
| 2006/0025897 A1 | * | 2/2006 | Shostak et al. | 701/1 |

FOREIGN PATENT DOCUMENTS

| | | |
|---|---|---|
| DE | 195 33 712 A1 | 3/1996 |
| DE | 299 03 260 U1 | 5/2000 |
| DE | 101 96 182 T1 | 3/2003 |
| EP | 0 800 059 A1 | 10/1997 |
| EP | 1 260 795 A2 | 11/2002 |

* cited by examiner

*Primary Examiner* — Phuong Huynh

(57) ABSTRACT

A measuring transducer has a sensor for recording a physical or chemical parameter and for generating a corresponding measurement signal and has an analytical device for determining a measured value dependent on the measurement signal and for outputting the measured value. A first interface for digital transmission of the measured value and a second interface are provided between the sensor and the analytical device. The analytical device is provided with a signal by the second interface, providing the measurement signal from the sensor. A synchronization of the analytical device t to the sampling time of the sensor is thus possible.

4 Claims, 1 Drawing Sheet

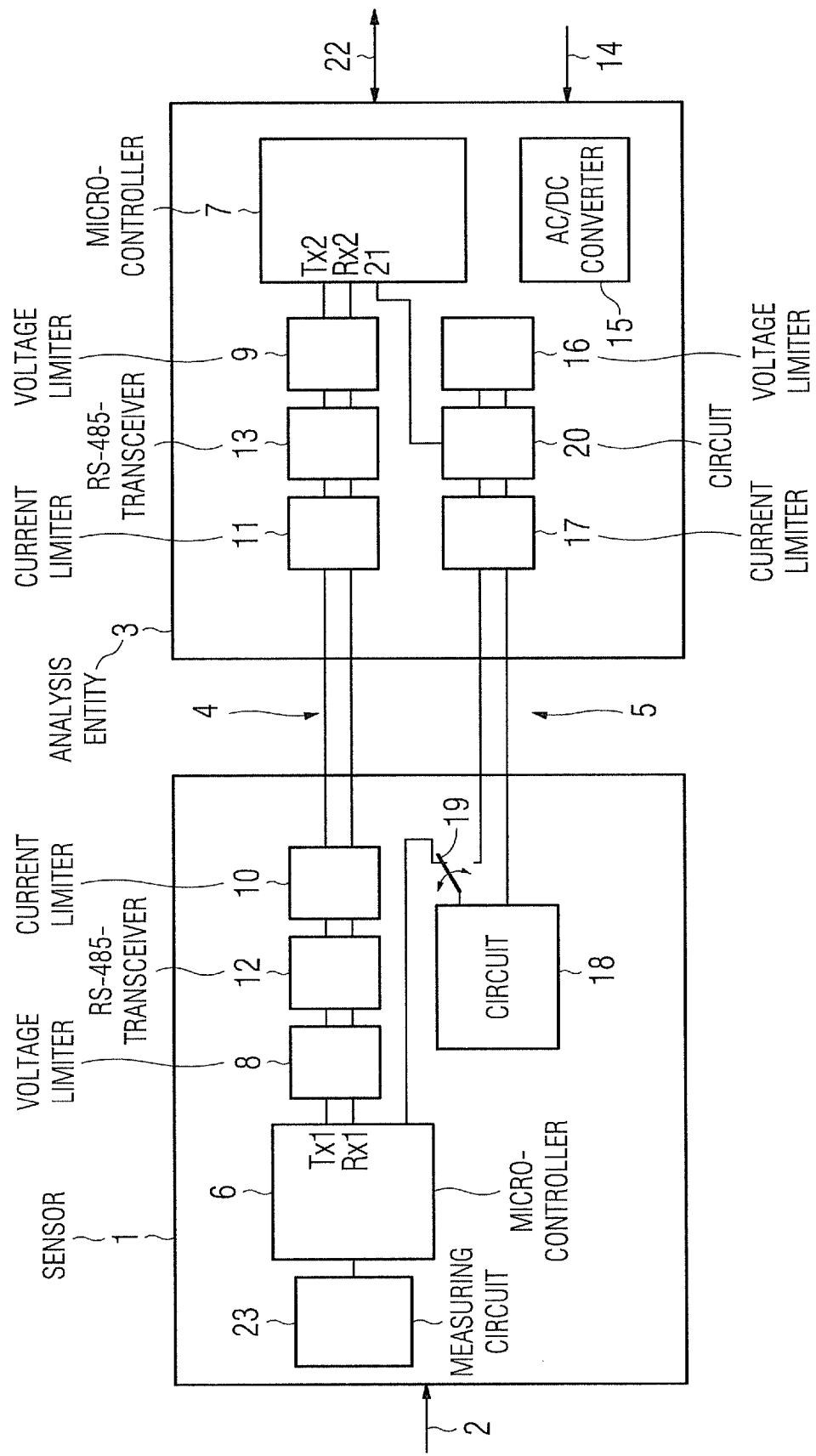

MEASURING TRANSDUCER

CROSS REFERENCE TO RELATED APPLICATIONS

This application is the US National Stage of International Application No. PCT/EP2007/055049 filed May 24, 2007 and claims the benefit thereof. The International Application claims the benefits of German application No. 10 2006 024 742.6 DE filed May 26, 2006. Both of the applications are incorporated by reference herein in their entirety.

FIELD OF INVENTION

The invention relates to a measuring transducer.

BACKGROUND OF INVENTION

In the context of automation engineering, field devices are frequently employed for process instrumentation, being used e.g. for capturing and/or influencing process variables, and being connected together by an automation network for the purpose of exchanging data, in particular via a field bus. Field devices which capture physical or chemical quantities as process variables are often referred to as measuring transducers, since they transform the relevant quantity into a measured value and output said value e.g. to a supervisory station at a higher level or as an actual value to a control unit for further processing. Examples of such measuring transducers include measuring transducers for fill level, flow rate, pressure, temperature, pH value, conductivity, etc.

Measuring transducers often have a modular structure. In the case of a measuring transducer for magnetically inductive flow measurement, for example, a sensor is used for capturing the flow speed as a physical quantity of a medium flowing through a measuring tube, and for generating a measurement signal which corresponds to the flow speed. An analysis entity is used for further analysis of the measurement signal and for performing the communication tasks, which include monitoring and diagnostic functions in addition to the transmission of the measured values. Depending on the measurement signal, the analysis entity calculates a measured value for the flow speed and outputs this via the communication interface for further processing, e.g. to a supervisory station at a higher level or to a control unit for flow control. Analysis units are often also referred to as transmitters.

SUMMARY OF INVENTION

In particular when using the measuring transducer in the context of sampling control, in which measured values are captured cyclically at specific instants and new actuating variables for the next sampling interval are calculated by a control unit with reference to the sampling intervals, it is important that actual values which are transferred to the control unit correspond to the current physical or chemical quantity. Temporal differences when capturing the quantity and determining the measured value adversely affect the control accuracy that can be achieved.

One object of the invention is to create a measuring transducer of modular construction, which allows a measured value that has been output to be attributed more accurately to the instant when the physical or chemical quantity was captured.

For the purpose of solving the object, the novel measuring transducer has the features specified in the independent claim. Advantageous developments of the invention are described in the dependent claims.

The novel measuring transducer has the advantage that it allows temporally accurate digital transmission of a measurement signal, which was formed in the sensor as a discrete-time sample of a physical or chemical quantity, to an analysis entity for digital further processing of the digital measurement signal that was captured discretely in time. Since the analog components comprising the measurement signal capture and signal preprocessing can be combined in the sensor in order to generate a digital measurement signal, it is no longer necessary to transmit analog signals over long connection lines. The sensitivity of the measuring transducer in relation to external interference which can corrupt analog data is therefore reduced and improved measuring accuracy is achieved. It can be considered a further advantage that the measuring transducer allows the analysis of the analysis entity to be synchronized with the sampling instants at which the sensor captures the physical or chemical quantity and generates a corresponding digital measurement signal. It is therefore possible significantly to reduce so-called jitter in the measured values which are output by the measuring transducer. Jitter signifies temporally fluctuating differences between planned and actual instants of recurring events. The effect of such jitter corresponds to noise being superimposed on the measured values and therefore causes a reduction in the measuring accuracy.

In the case of a field bus or an automation network featuring cyclical transmission of measured values, the measuring transducer also makes it possible to coordinate the generation of measurement signals by the sensor with the instants at which the measured values are output by the measuring transducer, i.e. to synchronize the sensor in relation to the analysis entity. This can be achieved easily in that the analysis entity initiates sampling of the physical or chemical value by the sensor so early that the analysis of the measurement signal is completed by the analysis entity at exactly the same instants as the cyclical transmission of measured values, such that a most current measured value is available at every instant in a transmission of measured values.

In the case of magnetically inductive flow meters, sensors supply approximately two to five updated measurement signals per second. When a measured value of the measuring transducer is requested via the field bus, provision of said measured value is often required within a few milliseconds. Therefore it can occur that the instant of capturing the physical or chemical quantity, from which the measured value was derived, is already 200 to 500 ms in the past. In order that this can be taken into consideration in the subsequent analysis of the measured value, the measured value can be equipped with a time stamp in the context of the data transmission via the field bus. The additional time information can be included in the control algorithm in order to improve the control accuracy, e.g. when the measured value is used in a control unit.

By means of a signal, the sensor notifies the analysis entity when a current measurement signal is available for transmission to the analysis entity. This has the advantage that the interface for digital transmission of the measurement signal can be embodied as a simple master-slave interface, in which the analysis entity as a master collects the digital measurement signal that is provided by the sensor as a slave. Such a digital interface can be realized at particularly low cost.

For the purpose of noise suppression, digital filter functions are already frequently integrated into the analysis entity of measuring transducers. The measuring accuracy can be further improved by taking into consideration, already in the context of this measured value filtering in the analysis entity, the relevant sampling instant of the physical or chemical quantity by the sensor.

As a further interface, it is advantageously possible to utilize a transmission entity which is provided for the purpose of transmitting, from the analysis entity to the sensor, the energy that is required to operate the sensor. Since sensors of measuring transducers are normally supplied with operating energy by the analysis entity, this embodiment is advantageous in that no additional connection between analysis entity and sensor is required for the purpose of implementing the further interface, and the manufacturing cost of the measuring transducer is reduced. This also has a beneficial effect on the availability of the measuring transducer, since no additional fault-susceptible plug connector contacts are required.

Furthermore, the analysis entity can advantageously be designed to monitor the refresh rate of the indicator signals of the sensor in terms of compliance with presettable limit values. When it is functioning correctly, the sensor outputs indicator signals to the analysis entity cyclically like a heartbeat. Functions for self-diagnosis can be integrated into the sensor. If the sensor detects an error by these means, it notifies the error to the analysis entity by interrupting the heartbeat, for example. An absence of an indicator signal is immediately recognized as an error state by the analysis entity. This makes it possible to achieve a higher safety class of the measuring transducer. Operators of installations based on automation engineering have an interest in organizing the relevant installation such that it is as operationally safe as possible. This safety is limited by possible malfunctions of the installation components during the operational phase. Each component can either continue to work incorrectly during live operation or fail completely. Depending on the integration of the defective component in the installation, the failure of an individual installation component can possibly cause the failure of the whole installation. In order to quantify the safety of installation components, Safety Integrity Levels (SIL) have been defined in accordance with the industry standard IEC 61508. In this context, a number specifies which safety level is offered by the relevant installation component. For example, "SIL1" signifies the SIL level 1 and represents the lowest protection level within the class model of the Safety Integrity Levels. "SIL2" signifies a higher protection level accordingly. Each safety class can be assigned a probability that the operation of the system will result in a loss of human life within 1,000 years, 10,000 years or 100,000 years. A higher safety class is therefore very important when the components are utilized.

It is advantageously possible further to increase the safety class if, particularly in the event of an error, sensor operating states can be transmitted in addition to the measurement signals themselves via the interface for digital transmission of the measurement signal. If the same safety data is transmitted via two independent interfaces from a data source to a data destination, the risk of incorrect safety data is reduced and the availability of the overall system is increased accordingly. The additional transmission of operating states also allows diagnostic functions of the measuring transducer. If an unsafe operating state of the sensor is detected, an indication of the incorrect operating state is given both via the digital interface and via the further interface, since indicator signals to the effect that current measurement signals are available are no longer output via the further interface.

BRIEF DESCRIPTION OF THE DRAWING

The invention, configurations and advantages are explained in greater detail below with reference to the drawing, in which an exemplary embodiment of the invention is illustrated.

DETAILED DESCRIPTION OF INVENTION

A measuring transducer of modular construction is illustrated in the sole FIGURE. It features a sensor 1 for capturing a physical or chemical quantity 2 and an analysis entity 3 for determining a measured value depending on a measurement signal. A measuring circuit 23 in the sensor 1 is used for capturing the physical or chemical quantity and for converting it into an electrical signal which can be processed further. This signal undergoes signal preprocessing in a microcontroller 6. A digital measurement signal which is generated by the sensor 1 according to the physical or chemical quantity 2 is transmitted to the analysis entity 3 via an interface 4. A further interface 5 is provided for the purpose of indicating by means of a signal to the analysis entity 3 that a current measurement signal of the sensor 1 is available for transmission. This measurement signal is then collected from the sensor 1 by the analysis entity 3 via the interface 4, which works in accordance with the master-slave principle. The relevant instant at which the digital measurement signal was generated by the sensor 1 is therefore known to the analysis entity 3. Additional codes for operating states, e.g. "measuring tube empty" or "magnetic circuit disrupted" in the case of a magnetically inductive flow measuring transducer, are transmitted via the digital interface 4 to the analysis entity 3 for the purpose of diagnostic functions. For the purpose of digital communication, so-called UART (Universal Asynchronous Receiver Transmitter) modules are integrated in each case into the microcontroller 6 and a microcontroller 7 of the sensor 1 and the analysis entity 3 respectively, and feature the outputs Tx1 and Tx2 and inputs Rx1 and Rx2 respectively. The interfaces 4 and 5 satisfy the requirements of explosion protection as per Ex(ia). Voltage limiters 8 and 9 and current limiters 10 and 11 are used in each case on the data paths of the interface 4 in order to ensure explosion protection. So-called RS-485 transceivers 12 and 13 are provided as line drivers. The power supply of the measuring transducer is provided via a 230-V connection 14. The supply voltage is converted by means of a so-called AC/DC converter 15 into an 18-V DC voltage which is used internally. The energy that is required to operate the sensor 1 is also taken from this within the analysis entity 3. In order to ensure explosion protection, a voltage limiter 16 and a current limiter 17 are provided for the further interface 5 which, in addition to transmitting the indicator signal, is used to transmit the energy that is required to operate the sensor 1. On the sensor 1 side, a circuit 18 is used for generating the internal operating voltage from the energy that is supplied. In order to indicate that a current measurement signal of the sensor 1 is available for transmission, use is made of a switch 19 which is opened briefly for the purpose of modulating the current that is drawn by the sensor 1. The indicator signal is captured by means of a circuit 20 on the analysis entity 3 side and is passed to an input 21 of the microcontroller 7 for further processing. Within the analysis entity 3, a measured value is obtained by means of suitable further processing of the digital measurement signal and is transmitted to other automation components in an automation network, e.g. via a field bus 22. Further components of the measuring transducer, which can be embodied in a known manner, are not illustrated in the FIGURE for the sake of clarity.

The invention claimed is:
1. A measuring transducer, comprising:
a sensor for capturing a physical or chemical quantity and for generating a corresponding measurement signal, wherein the sensor comprises a microcontroller for signal preprocessing of the measurement signal;

an analysis device for determining a measured value depending on the measurement signal and for outputting the measured value;

an interface between the sensor and the analysis device for digital transmission of the measurement signal;

a transmission device for transmitting energy required for operation of the sensor from the analysis device to the sensor;

a switch for changing a supply current for indicating that the measurement signal of the sensor is available for transmission; and a circuit for capturing the changing of the supply current and analyzing the changing as an indicator signal, wherein the measuring transducer is used for process instrumentation, wherein the sensor is synchronized in relation to the analysis device such that the generating of the measurement signal by the sensor is coordinated with instants at which the measured value is output by the analysis device, and wherein operating states of the sensor are transmitted from the sensor via the interface to the analysis device for diagnosing the operating states of the measuring transducer, wherein an incorrect operating state is indicated at the analysis device.

2. The measuring transducer as claimed in claim 1, wherein the switch is part of the sensor.

3. The measuring transducer as claimed in claim 1, wherein the circuit is part of the analysis device.

4. The measuring transducer as claimed in claim 1, wherein the analysis device is designed to monitor a refresh rate of the indicator signals of the sensor for compliance with presettable limit values.

* * * * *